(12) United States Patent
Humphries et al.

(10) Patent No.: US 8,683,947 B2
(45) Date of Patent: Apr. 1, 2014

(54) LIQUID RESERVOIR AND BIRD FEEDER INCORPORATING THE SAME

(75) Inventors: Romilly Humphries, South Bristol, ME (US); Brian K. Krueger, Denver, CO (US)

(73) Assignee: Woodstream Corporation, Lititz, PA (US)

(*) Notice: Subject to any disclaimer, the term of this patent is extended or adjusted under 35 U.S.C. 154(b) by 201 days.

(21) Appl. No.: 13/064,614

(22) Filed: Apr. 4, 2011

(65) Prior Publication Data

US 2011/0180004 A1 Jul. 28, 2011

Related U.S. Application Data

(63) Continuation of application No. 11/547,719, filed as application No. PCT/US2005/011968 on Apr. 7, 2005, now Pat. No. 7,918,184.

(60) Provisional application No. 60/560,558, filed on Apr. 7, 2004.

(51) Int. Cl.
A01K 39/04 (2006.01)

(52) U.S. Cl.
USPC .......................................... 119/51.5

(58) Field of Classification Search
USPC .......................................... 119/51.5, 72, 74
See application file for complete search history.

(56) References Cited

U.S. PATENT DOCUMENTS

| | | | |
|---|---|---|---|
| D20,449 S | 1/1891 | Fletcher | |
| 904,584 A * | 11/1908 | Weldon | 119/51.5 |
| 1,051,823 A * | 1/1913 | Reavis | 119/51.5 |
| 1,113,887 A * | 10/1914 | Dragan | 119/51.5 |
| D51,999 S | 4/1918 | Vaughn | |
| 2,583,218 A * | 1/1952 | Lambeth | 119/51.5 |
| D200,317 S | 2/1965 | Etnyre | |
| 3,577,957 A * | 5/1971 | Sandig | 119/51.11 |
| 4,327,669 A | 5/1982 | Blasbalg | |
| 4,441,457 A | 4/1984 | Sanford | |
| 4,632,061 A | 12/1986 | Tucker et al. | |
| 4,767,088 A | 8/1988 | Fielder et al. | |
| 5,044,319 A | 9/1991 | Blasbalg | |
| 5,195,460 A | 3/1993 | Loken | |
| 5,253,609 A | 10/1993 | Partelow et al. | |
| D341,911 S | 11/1993 | Thomsen | |
| 5,433,171 A | 7/1995 | Ewell | |
| 5,488,927 A | 2/1996 | Lorenzana et al. | |
| 5,560,316 A | 10/1996 | Lillelund et al. | |
| 5,740,762 A | 4/1998 | Bennett | |
| 5,771,839 A | 6/1998 | Marsh | |
| D420,177 S | 2/2000 | Jones | |
| 6,116,189 A | 9/2000 | Rundle | |
| 6,142,099 A * | 11/2000 | Lange, Jr. | 119/51.5 |
| 6,318,290 B1 * | 11/2001 | Fisher | 119/51.5 |
| 6,386,142 B1 | 5/2002 | Holscher et al. | |
| D459,840 S | 7/2002 | Lian | |
| 6,546,894 B2 * | 4/2003 | Chrisco et al. | 119/52.2 |
| 6,662,745 B2 | 12/2003 | Chrisco et al. | |
| 6,889,629 B2 | 5/2005 | Swift et al. | |
| D521,194 S | 5/2006 | Weiland | |
| 7,185,606 B1 | 3/2007 | Racine | |
| 7,530,330 B1 * | 5/2009 | Valle | 119/69.5 |
| 2010/0024735 A1 * | 2/2010 | Ho | 119/51.5 |
| 2012/0037078 A1 * | 2/2012 | Bradley | 119/51.5 |

* cited by examiner

*Primary Examiner* — Kimberly Berona
(74) *Attorney, Agent, or Firm* — Jacobson Holman PLLC

(57) ABSTRACT

A bird feeder generally in the form of hopper feeder that is coupled with a water reservoir. The hopper feeder generally includes a seed reservoir that receives and holds bird seed, which is dispensed to the birds by way of feeding stations. The hopper further provides a liquid reservoir for dispensing drinking water to visiting birds.

14 Claims, 11 Drawing Sheets

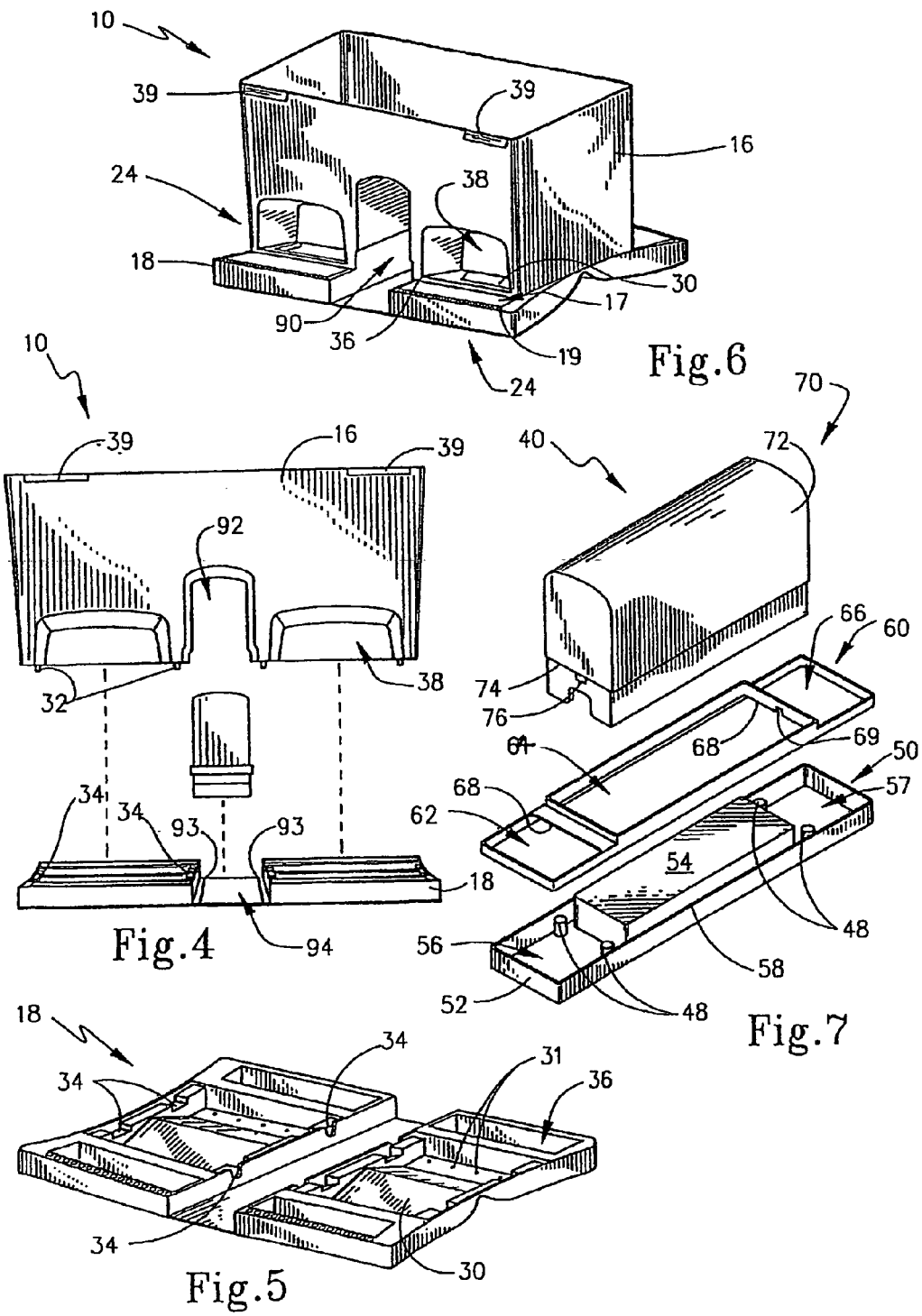

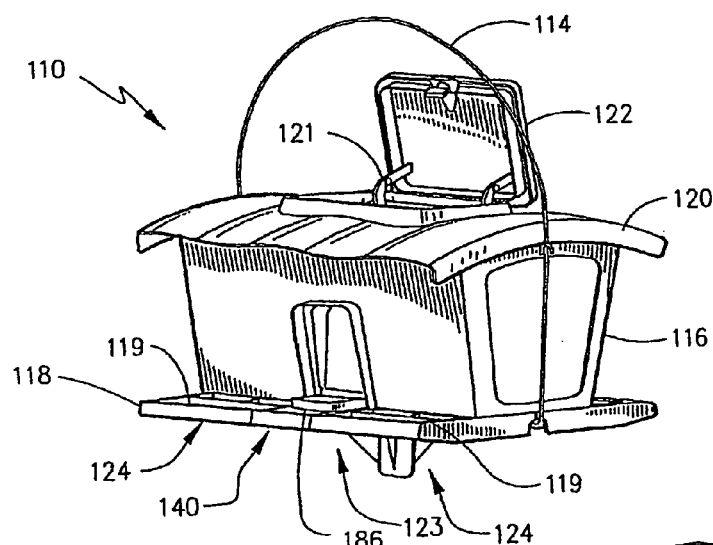
Fig. 9
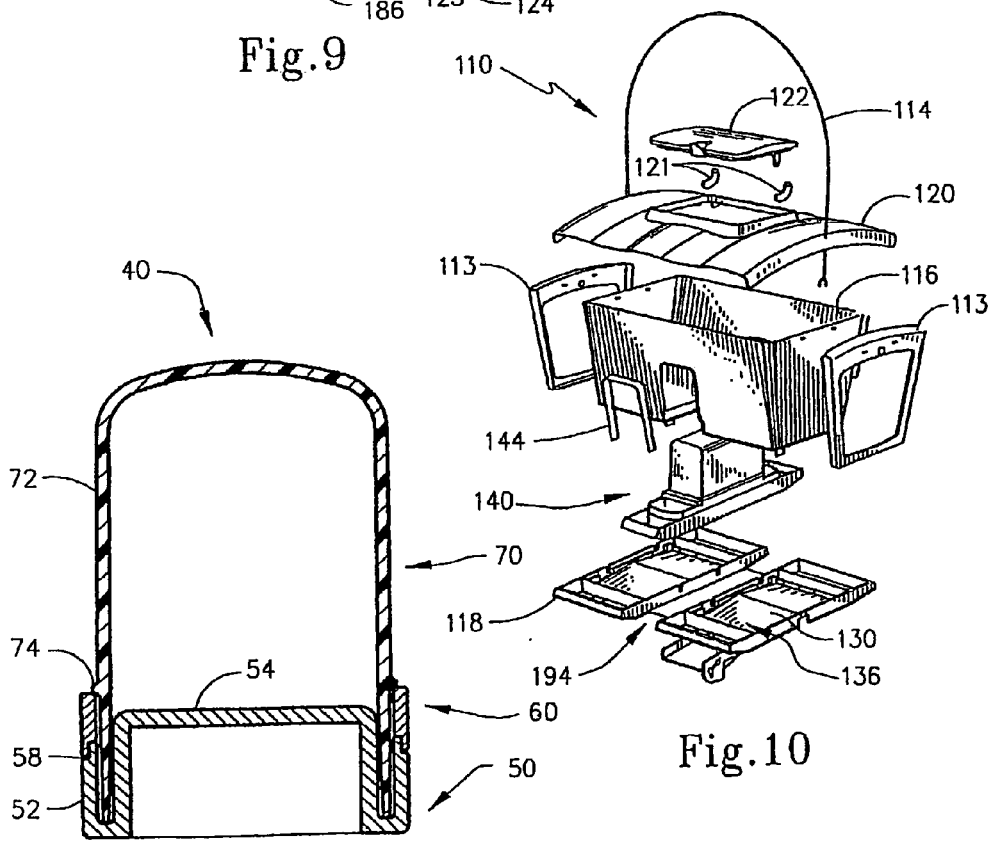
Fig. 8
Fig. 10

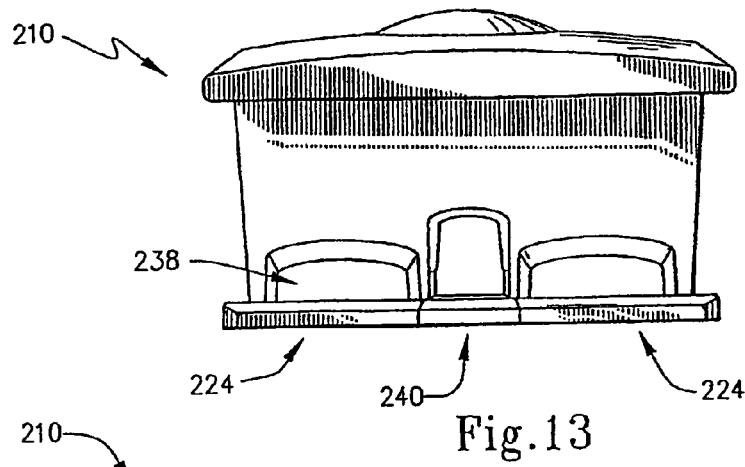
Fig.13
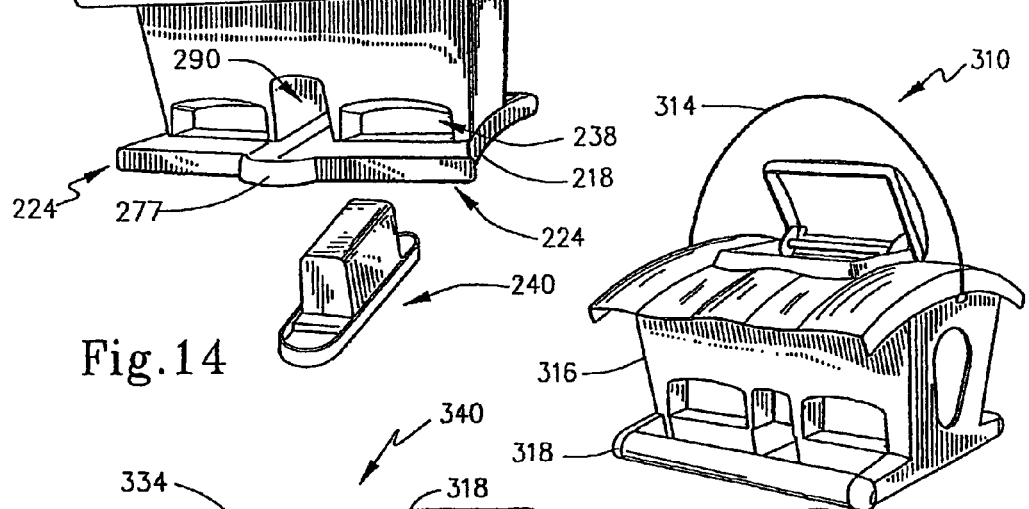
Fig.14
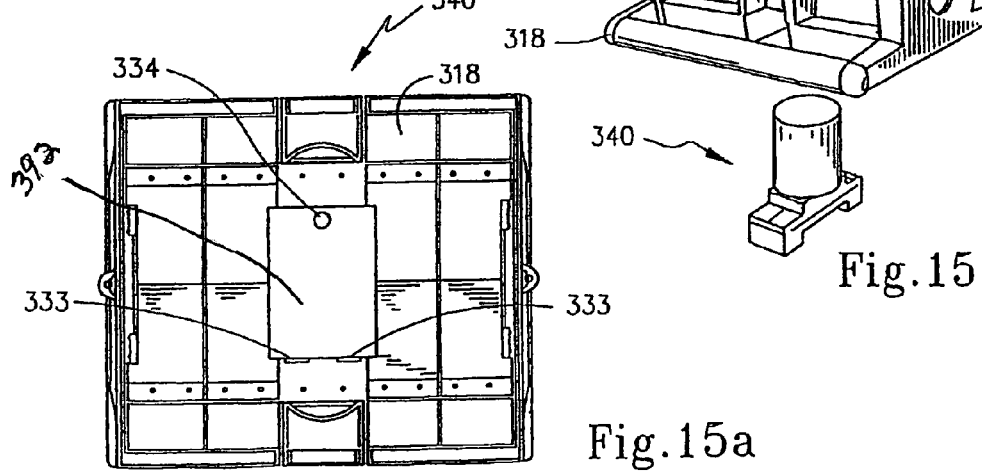
Fig.15
Fig.15a

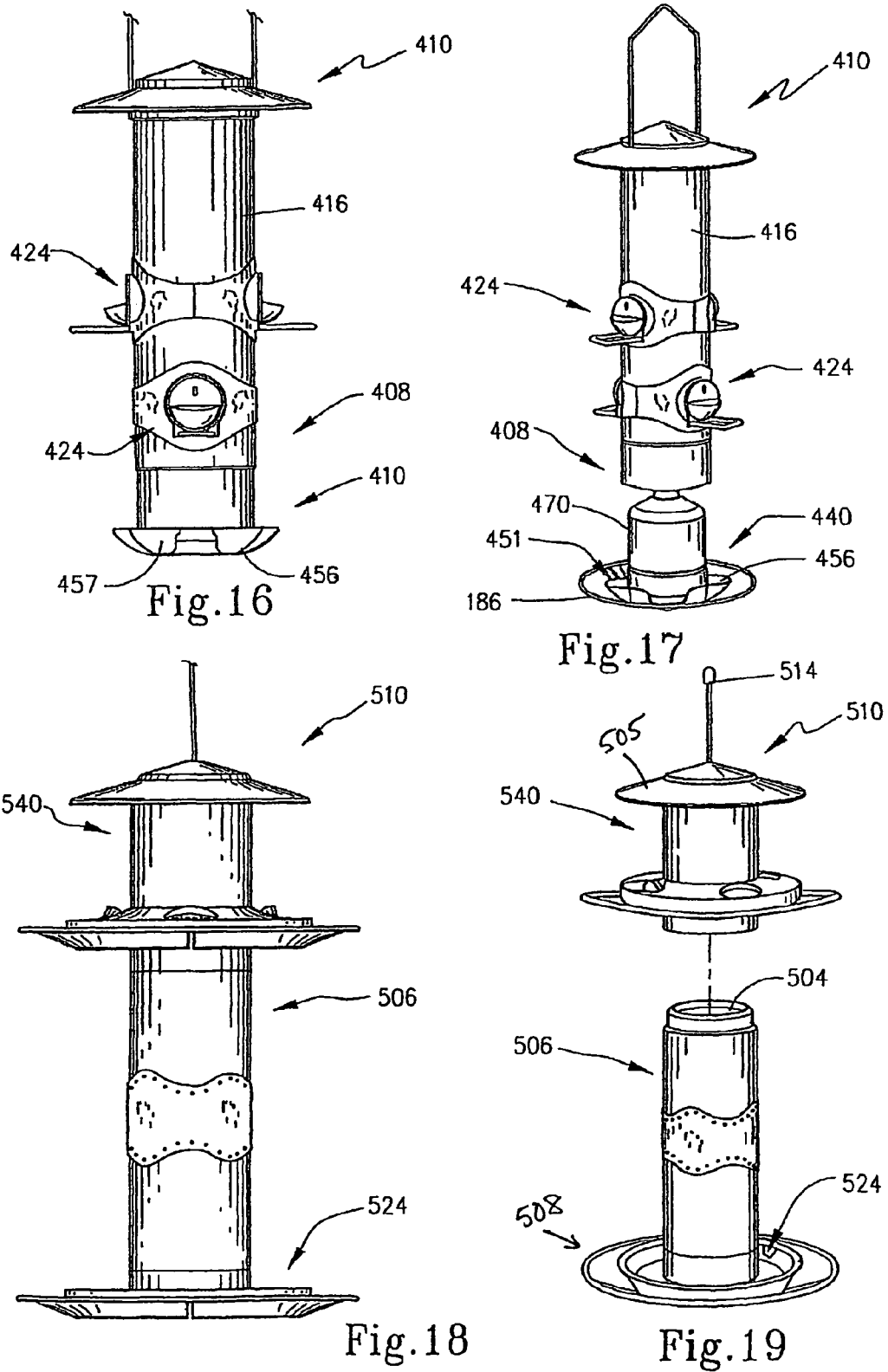

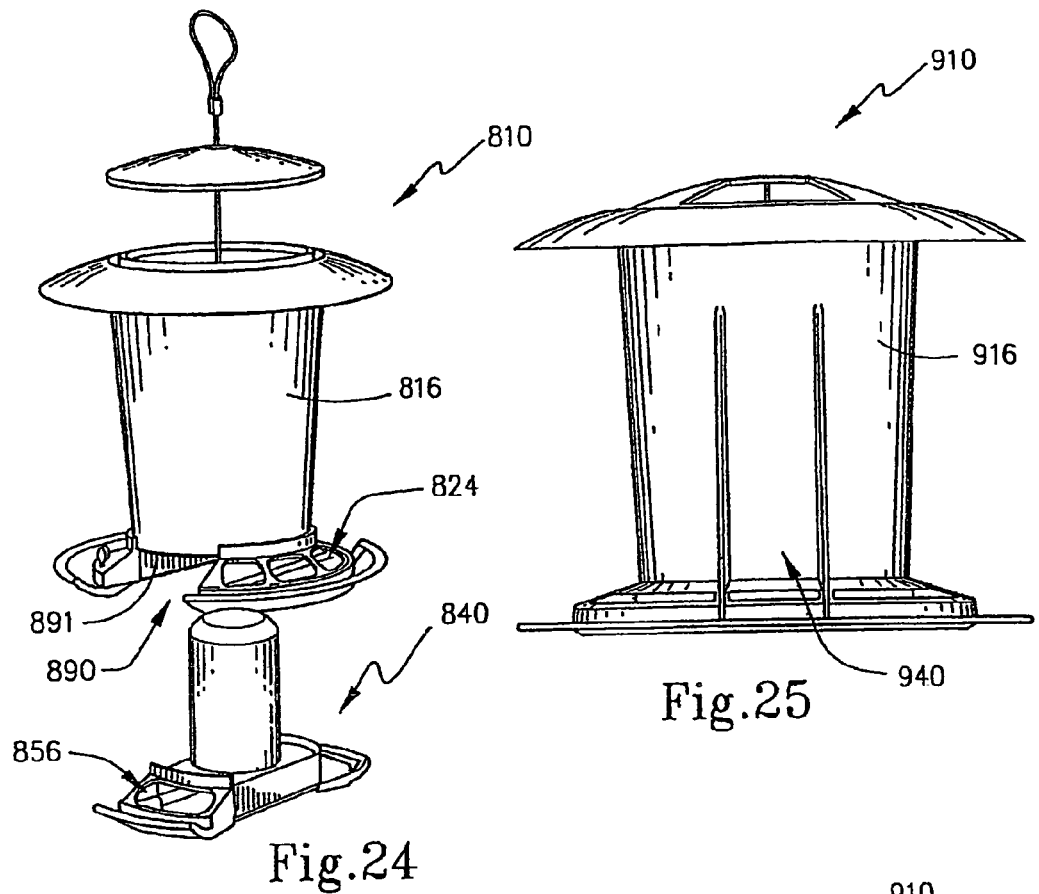
Fig.24
Fig.25
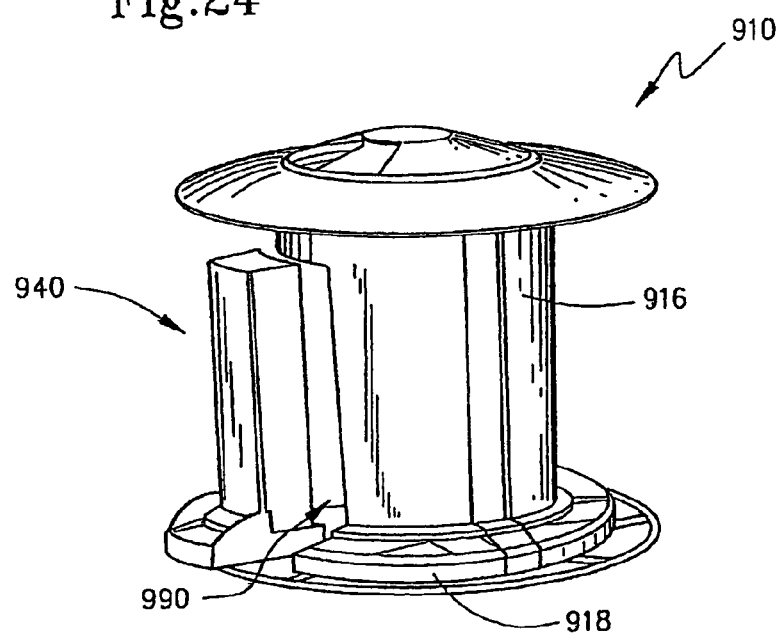
Fig.26

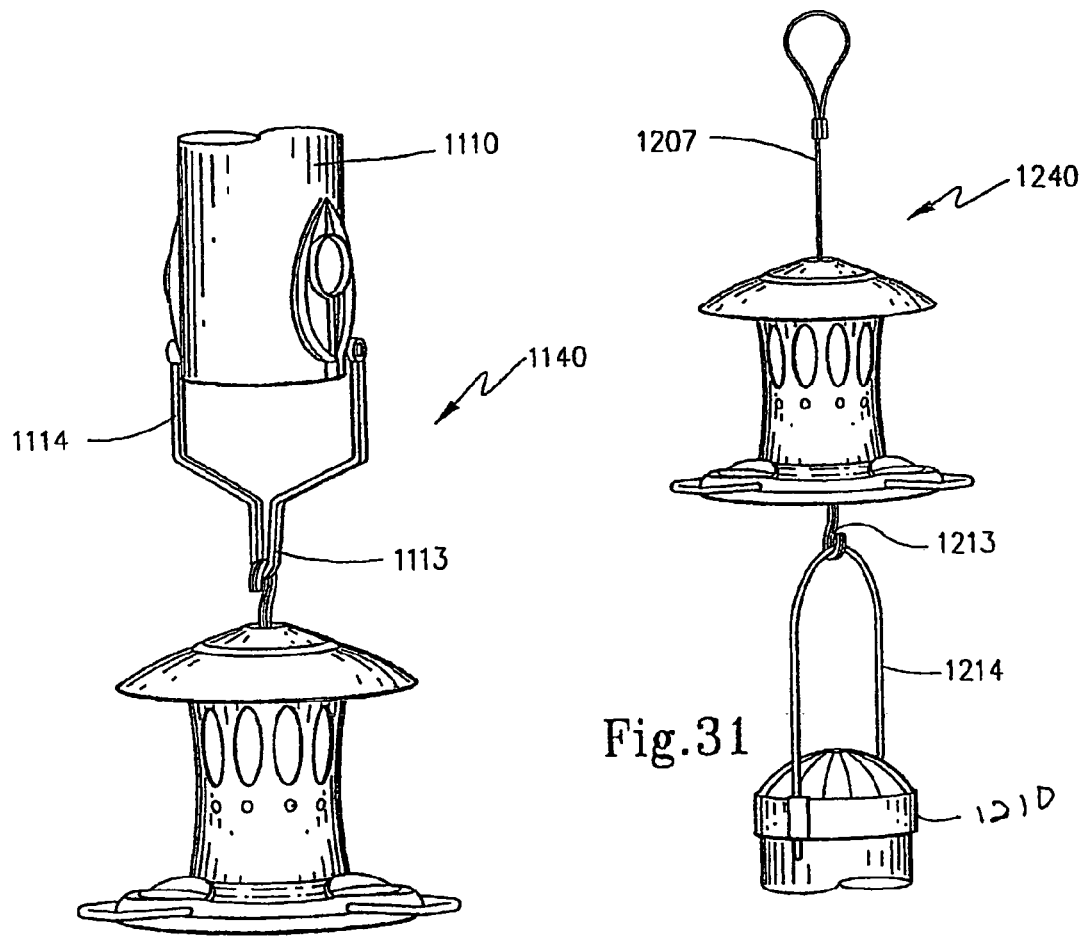
Fig.30
Fig.31
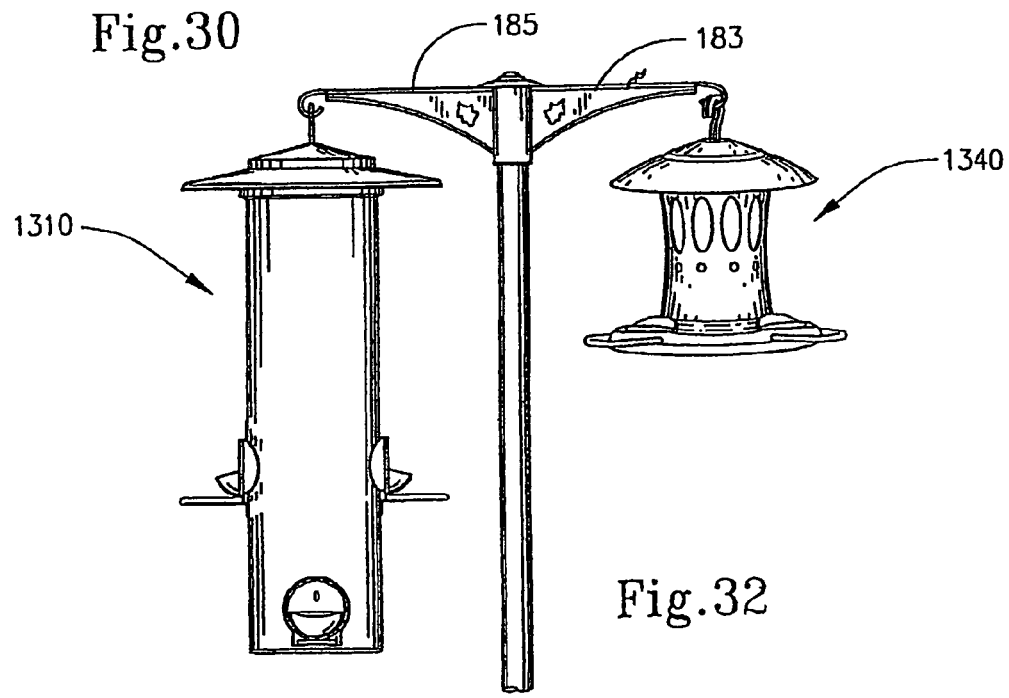
Fig.32

LIQUID RESERVOIR AND BIRD FEEDER INCORPORATING THE SAME

This is a continuation of application Ser. No. 11/547,719 filed Jul. 31, 2007, which will issue as U.S. Pat. No. 7,918,184 on Apr. 5, 2011, and which is a nationalization of PCT/US05/011968 filed Apr. 7, 2005 and published in English, claiming benefit of U.S. provisional application No. 60/560,558 filed Apr. 7, 2004, and hereby claims the foregoing priority to which it is entitled.

BACKGROUND OF THE INVENTION

1. Field of the Invention

The present invention generally relates to apparatuses for attracting wild birds. More particularly, the present invention is directed to a new and useful bird feeder. The present invention is further directed to an apparatus that provides a source of water to birds.

2. Description of the Related Art

Bird watching is a highly prevalent past time in both urban and rural areas. The world is full of birds of numerous varieties in an astounding array of colors and designs. Many people enjoy viewing birds of various types, and an industry has evolved around products directed to improving the ability of persons to closely observe birds in their natural environment. On one hand, many people venture into the outdoors, where binoculars and spotting scopes may be utilized to better view various birds in their natural habitats. Such an approach requires a certain degree of skill, however, in finding and spotting various species of birds. Another approach utilizes various means of attracting birds to one's residence or a desired viewing location, such as adjacent a home's porch or window, where birds may be viewed at one's leisure. For example, persons have used bird feeders, birdbaths, and the like to attract birds of various types to their homes.

Providing birds with food is, perhaps, one of the simplest ways of attracting wild birds, especially in the winter months when food is scare. There are a variety of seed dispensing bird feeders existing on the market today that are constructed to dispense common foodstuffs such seeds, grains, suets, and nectars. Certain varieties of birds will be attracted to certain foodstuffs, and thus the selection of a particular type of food dispensing bird feeder results in the attraction of a particular variety of bird.

Another simple and perhaps more effective way of attracting birds is to make water available to them. Birds must drink water to avoid dehydration and, since they do not have salivary glands, birds need water to digest their food. Birds also need water for bathing, which helps keep their feathers functioning for regulating their body temperature. Birds feeding at the bird feeder will oftentimes also be attracted to the open water. In addition, open water will attract insect eating birds that do not feed on seed such as bluebirds, robins, and flycatchers to name a few. Accordingly, open water enhances the variety of bird's one is able to attract.

Simply setting out a shallow bowl or dish of water will attract birds. However, perhaps the most common and decorative way of making water available to birds is with a birdbath. Birdbaths are usually placed a top a pedestal and are shallow enough to allow the bird to stand in the water. Visiting birds will use the birdbath to both consume water and bathe.

There are several drawbacks associated with birdbaths. First, there is little protection of the water from the elements allowing it to evaporate or freeze depending upon the conditions, making the water unavailable. Further, most birdbath constructions provide the water as a standing, stagnant, open pool, which invites contaminates, formation of algae, and may serve as a breeding ground for mosquitoes. Birds that visit the birdbath often deposit fecal matter into the bath, which soils the water and makes it unhealthy and unattractive. In addition, many birdbaths are placed low enough to the ground, or in an unsafe location, such that cats can easily stalk and kill visiting birds.

In addition to the foregoing, space may be limited for hanging bird feeders as well as providing birdbaths, especially for individuals living in apartments with limited balcony space. For others, time and money may simply limit one's ability to acquire and maintain both bird feeders and birdbaths resulting in the selection of one over the other. In fact, it is estimated that the 60 million people who feed birds do not provide birds with water. As a result, birds spend a great deal of time and energy searching for available water sources at locations distant from their food source.

Since water is essential part of a bird's diet, there has long been a need for providing birds with a water source that is protected from the elements, that is clean, and that makes efficient use of available space and time to maintain. The present invention is directed to meeting these needs.

SUMMARY OF THE INVENTION

An object of the present invention is to provide a new and useful apparatus to serve as a water source for birds.

Another object of the present invention is to provide a new and useful apparatus that serves as both a source of food and water for birds.

Also, an object of the present invention is to provide birds with a source of water that is protected from the elements.

Yet another object of the present invention is to provide a new and useful source of drinking water for birds that is easy to maintain and makes efficient use of space.

A still further object of the present invention is to provide a source of drinking water for birds that is elevated so as to keep the bird safe while visiting.

According to the present invention, then, an apparatus is provided that is adapted to dispense nutrients to birds comprising a housing including two reservoirs—a first reservoir adapted to receive and dispense a solid nutrient, and a second reservoir adapted to receive and dispense a liquid nutrient. Each reservoir is associated with a respective port wherein a first outlet port is in fluid communication with the first reservoir and the second outlet port is in fluid communication with the second reservoir. The solid nutrients dispensed may be a birdseed selected from the group consisting of mixed birdseed and thistle birdseed while the liquid nutrient dispensed may be selected from water and a liquid solution containing sugar, minerals or vitamins. The apparatus may include a plurality of spaced apart first and second ports, which may further be arranged such that a first outlet port flanks both sides of a second outlet port.

The housing may further, include a bay in which the second reservoir is received when in a mounted state. The second reservoir may further be comprised of a base member and a receptacle member supported thereby and adapted to receive the liquid nutrient therein. Particularly, the base member may include a centrally located platform that divides the base member into a pair of liquid nutrient compartments on either side thereof. Both the first and second liquid nutrient compartments are in fluid communication with the liquid receptacle so that the liquid nutrient may be received and collected therein. Further, the second reservoir may include a bracket interposed between the base member and the receptacle member that is operative to signify to the birds the presence of said liquid nutrient.

The apparatus of the present invention may further be provide with a hanger member, a pole member, to support the housing assembly thereby. Specifically, the hanger member is adapted to support the housing assembly from a support structure against the force of gravity while the pole member supports the housing assembly in spaced relation to the support surface.

The present invention is also directed to an apparatus for dispensing nutrients to a bird that comprises a housing assembly that includes a first reservoir adapted to receive and dispense a solid nutrient and configured to have a bay and a first outlet port in fluid communication therewith. The housing assembly also includes a second reservoir adapted to receive and dispense a liquid nutrient that is sized and adapted to be received in the bay to define a mounted state and a second outlet port in fluid communication therewith. As described above, the apparatus may dispense of mixed birdseed and thistle birdseed as well as a liquid nutrient that is selected from water and a liquid solution containing sugar, minerals or vitamins and include a plurality of ports therefore.

In this embodiment, the first reservoir may include a bottom wall and a surrounding sidewall extending upwardly therefrom such that the bay may be formed either in the sidewall or the bottom wall. The bay may further include an arched bay sidewall wherein the bottom wall of the first reservoir provides a seat for the second reservoir. When the bay is formed in the bottom wall, the apparatus may further be provided with a door associated therewith that provides a seat for said second reservoir when in the mounted state. The second reservoir may further be provided with threaded fasteners so as to be threadably received in the bay.

The present invention is further direct to a bird feeder adapted to provide birdseed to birds, which includes a birdseed reservoir adapted to receive and contain the birdseed therein. The improvement comprises a bay formed in the birdseed reservoir and a liquid nutrient reservoir sized and adapted to be received in the bay to define a mounted state and having a liquid nutrient port in fluid communication with the liquid nutrient reservoir. The bay and the construction of the liquid nutrient reservoir may be constructed as discussed above.

The birdseed reservoir may have a configuration selected from the group consisting of tubular, rectangular, and frustoconical. The birdfeeder may further be provided with a feeding station where the birdseed is dispensed. The birdseed reservoir may include a seed diffuser disposed therein to facilitate the dispensing of the birdseed. The feeding station may include a seed outlet port in fluid communication with the birdseed reservoir and a perch located proximate thereto. Perches located proximate to the liquid nutrient ports may be provided to together therewith define a drinking station. The bird feeder may be provided with both a plurality of such feeding stations and drinking stations.

These and other objects of the present invention will become more readily appreciated and understood from a consideration of the following detailed description of the exemplary embodiments of the present invention when taken together with the accompanying drawings, in which:

BRIEF DESCRIPTION OF THE DRAWINGS

FIG. 4 is an exploded front view in elevation of the seed birdseed reservoir, liquid reservoir, and platform of the birdfeeder shown in FIGS. 1 and 2.

FIG. 5 is a perspective view of the platform shown in FIG. 4.

FIG. 6 is a perspective view of the birdfeeder shown in FIGS. 1 and 2 without the roof.

FIG. 7 is an exploded perspective view of the liquid reservoir, which is incorporated by the bird feeder shown in FIGS. 1 and 2.

FIG. 8 is a cross-sectional view of the liquid reservoir shown in FIG. 3, taken about lines 8-8.

FIG. 9 is a perspective view of the birdfeeder and liquid reservoir incorporated thereby both according to a second embodiment of the present invention.

FIG. 10 is an exploded perspective view of the birdfeeder shown in FIG. 9.

FIG. 13 is a front view in elevation of a birdfeeder and liquid reservoir incorporated thereby both according to a third embodiment of the present invention.

FIG. 14 is an exploded perspective view of the birdfeeder shown in FIG. 13 with the liquid reservoir removed from its bay.

FIG. 15 is an exploded perspective view of a birdfeeder and a liquid reservoir incorporated thereby both according to a fourth embodiment of the present invention.

FIG. 15(a) is a bottom plan view of the birdfeeder shown in FIG. 15 when the liquid reservoir is in the mounted state.

FIG. 16 is a front view in elevation of a birdfeeder and a liquid reservoir incorporated thereby both according to a fifth embodiment of the present invention.

FIG. 17 is an exploded perspective view of the birdfeeder shown in FIG. 16 with the liquid reservoir removed from its bay.

FIG. 18 is a front view in elevation of a birdfeeder and a liquid reservoir incorporated thereby both according to a sixth embodiment of the present invention.

FIG. 19 us an exploded perspective view of the birdfeeder shown in FIG. 18 with the liquid reservoir removed from its bay.

FIG. 24 is an exploded perspective view of a birdfeeder and a liquid reservoir incorporated thereby and removed from its bay, both according to a ninth embodiment of the present invention.

FIG. 25 is a front view in elevation of a birdfeeder and a liquid reservoir incorporated thereby both according to a tenth embodiment of the present invention.

FIG. 26 is an exploded perspective view of the birdfeeder shown in FIG. 25 with the liquid reservoir removed from its bay.

FIG. 30 is a front view in elevation of a bird feeder, partially cut away, with a liquid reservoir suspended therefrom according to a twelfth embodiment of the present invention.

FIG. 31 is a front view in elevation of a bird feeder, partially cut away, suspended from a liquid reservoir according to a thirteenth embodiment of the present invention.

FIG. 32 is a front view in elevation of a post having suspended therefrom a conventional tube feeder and a liquid reservoir according to a fourteenth embodiment of the present invention.

DETAILED DESCRIPTION OF THE PREFERRED EMBODIMENTS

The present invention relates to a new and useful apparatus for attracting birds. More particularly, the present invention is directed to a new and useful apparatus for dispensing solid and liquid nutrients birds. One aspect of the present invention is directed to providing an apparatus that has a housing assembly that includes a first reservoir for receiving and dispensing solid nutrients and a second reservoir for receiving and dispensing liquid nutrients. The present invention is further directed to a birdseed reservoir having a bay formed therein for receiving a liquid nutrient reservoir. The present invention further contemplates providing a birdfeeder and liquid nutrient dispenser assembly wherein the bird feeder either supports or is suspended from the liquid dispense whereby each is in close proximity to the other.

Figure 1:
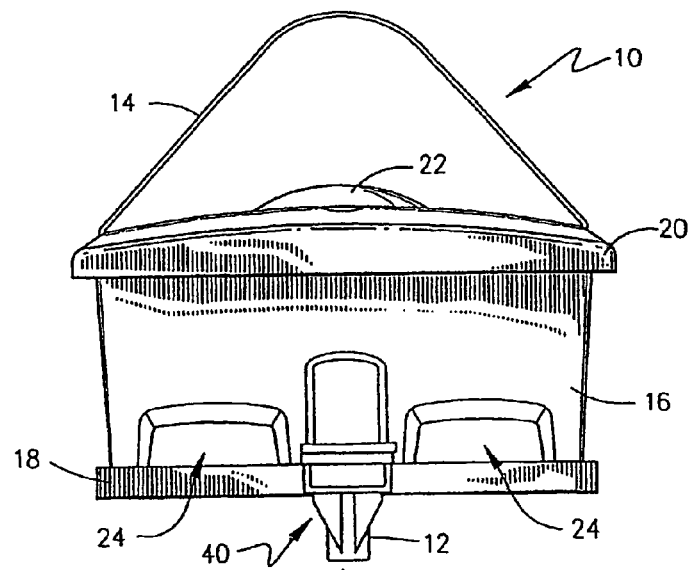
FIG. 1 is a front view in elevation of the birdfeeder and liquid reservoir incorporated thereby both according to a first embodiment in the present invention.
Figure 2:
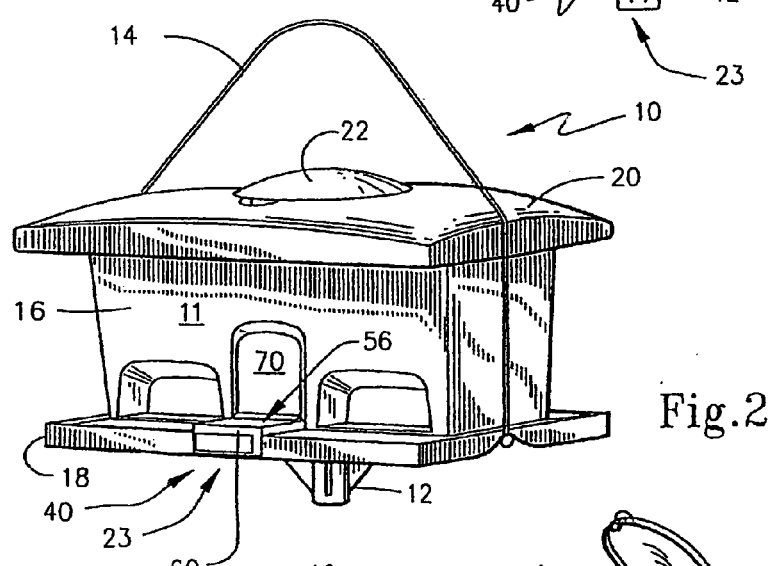
FIG. 2 is a perspective view of the birdfeeder shown in FIG. 1.
Figure 3:
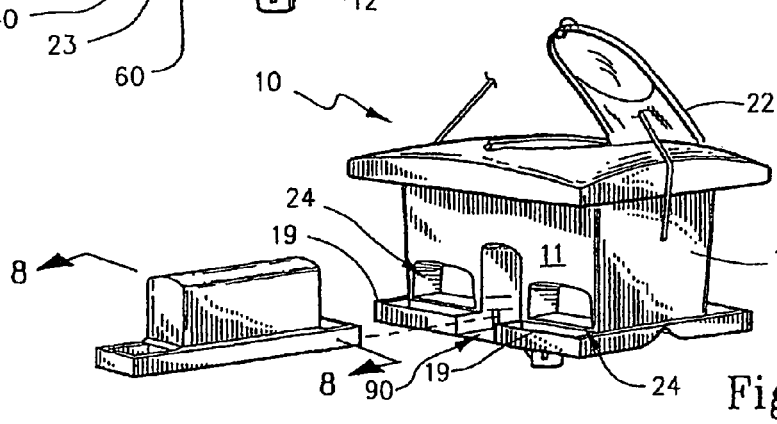
FIG. 3 is an exploded perspective view of the birdfeeder shown in FIGS. 1 and 2 and the liquid reservoir removed from its bay.

To better understand the construction of the present invention, reference is first made to FIGS. 1-3, which show a bird feeder generally in the form of hopper feeder 10 that is coupled with a liquid nutrient reservoir 40, according to a first embodiment of the present invention. Hopper feeder 10 generally includes pole mount 12, hanger 14, a first reservoir for receiving and dispensing solid nutrients, shown here in, the form of a birdseed reservoir 16, which is seated on platform 18, which forms a bottom wall therefor, perches 19, roof 20, and lid 22. Birdseed reservoir 16 has a surrounding sidewall 11 that extends upwardly from platform 18 and is adapted to receive birdseed and dispense the birdseed at feeding stations 24, which are in fluid communication with the birdseed reservoir 16. Birds may alight on perches 19, which are associated with feeding stations 24 to feed. The solid nutrients dispensed by the first reservoir may include either mixed birdseed or thistle birdseed, but is not limited to dispensing these types of birdseed.

Hopper 10 further includes a second reservoir for receiving and dispensing liquid nutrients, shown here in the form of liquid reservoir 40. The liquid nutrients dispensed by reservoir 40 may include water alone, but may further include a prepared liquid solution that contains sugar, minerals, vitamins, or a combination thereof.

Before describing the components of liquid reservoir 40, it is perhaps first useful to further describe the construction of hopper 10. Since birdseed reservoir 16 and platform 18 are symmetrical in construction, a representative side of birdseed reservoir 16 and platform 18 will be used to further discuss their respective features. Turning then to FIGS. 4-6, birdseed reservoir 16 is adapted to be seated upon platform 18. Birdseed reservoir 16 includes prongs 32 that are adapted to be received by mounting holes 34 formed in platform 18. Birdseed reservoir 16 further includes mounting tabs 39 that are adapted to be received within cooperating mounting holes in roof 20 (not shown).

As shown, platform 18 further includes seed diffusers, such as representative seed diffuser 30. As should be understood, once birdseed reservoir 16 is mounted on platform 18 and filled with seed, seed diffuser 30 assists in the even distribution of seed via first outlet ports 36, shown here in the form of feeding bays, which are in fluid communication with the birdseed reservoir. Bays 36 also form a part of feeding stations 24. Diffuser 30 further helps to reduce the volume of seed within birdseed reservoir 16 that cannot be reached by feeding birds.

Apertures 31, located adjacent seed diffuser 30 and in feeding bays 36, allow for waste materials that the bird may discard while eating to be disposed therethrough. Apertures 31 may of a suitable size and number to allow for efficient discard of waste materials therethrough, while not resulting in the loss of the food. For example, apertures 31 may be approximately 3/32 inches in diameter and there are preferably between about six (6) and eight (8) apertures per bay 36. As shown, platform 18 may include holes 17, located in between perch 19 and bay 36. Holes 17 assist in keeping the area about food station 24 clean of fecal matter.

With continued reference to FIGS. 4 and 6, feeding stations 24 further include alcoves, such as alcove 38 formed in birdseed reservoir 16. As perhaps best shown in FIG. 6, alcoves 38 shelter the seed dispensed into bay 36 from the elements such as rain, sleet, and snow. Protecting the food from the weather helps maintain the freshness of the food and helps keep the food dry so that seed is permitted to continually flow from within birdseed reservoir 16 to the bays 36.

Birdseed reservoir 16 and platform 18 may be formed as a unitary one-piece construction of plastic, wood, metal, glass, a combination thereof, or other suitable material. Preferably, birdseed reservoir 16 is at least somewhat transparent to ease the determination of the seed level within.

Now that various features of both birdseed reservoir 16 and platform 18 have been discussed, liquid reservoir 40 may now be described in more detail. As shown in FIG. 3, liquid reservoir 40 is adapted to be received within bay 90. As shown in FIG. 4, bay 90 is formed in the sidewall of birdseed reservoir 16 and platform 18, where platform 18 provides a seat for reservoir 40. More particularly, birdseed reservoir 16 includes arched corridor 92 formed therein that is sized and adapted for receiving an upper portion of liquid reservoir 40. Similarly, platform 18 includes channel 94 formed therein that is sized and adapted to receive a lower portion of liquid reservoir 40. Channel 94 further includes feet 93, which elevate the assembled liquid reservoir slightly above the surface when placed therein. Together, corridor 92 and channel 94 form bay 90.

With reference to FIGS. 7 and 8, liquid reservoir 40 is shown as generally having three components: base member 50, bracket member 60 and liquid receptacle member 70.

Each of these three components may be formed as a unitary one-piece construction of suitable material, such as plastic, or other suitable material. Liquid reservoir 40 is adapted to be removed from bay 90 so as to be filled and re-filled with the liquid nutrient.

Base member 50 includes a surrounding sidewall 52 and a raised platform 54. As shown, sidewall 52 is of a reduced height to platform 54 and two outlet ports, shown in the form of water compartments 56 and 57, are formed on either side thereof in fluid communication with receptacle member 70. Water compartments 56 and 57 receive and allow the liquid to be collected therein, which will be discussed in more detail below. Bracket member 60 is adapted to be seated on base 50. To this end, base member 50 further includes flange 58, which extends about the perimeter of sidewall 52 and is adapted to receive bracket 60 in a nested stated. Base member 50 also includes mounting holes 48 for receiving mounting pegs 68 of bracket member 60 to help retain bracket member 60 seated on base member 50 when assembled.

As best shown in FIG. 7, bracket member 60 includes a sidewall 61 with three openings 62, 64, and 66 formed therein. Openings 62, 64, and 66 are adapted to align, respectively, water compartment 56, shelf 54, and water compartment 57, and when assembled, do not interfere with the birds access to water compartments 56 and 57.

With continued reference to FIGS. 7 and 8, liquid receptacle member 70 is adapted to be filled and re-filled with water. Liquid receptacle member 70 includes a surrounding sidewall, which forms an interior for receiving water. Preferably, liquid receptacle member 70 is filled with water up to the "FILL LINE" as written thereon. Liquid receptacle member 70 includes rim 74, which extends about its perimeter of sidewall 72 and is adapted to nest with bracket member 60 when assembled. Further, liquid receptacle member 70 is adapted to be received through opening 64 of bracket member 60 and positioned between shelf 54 and sidewall 52 of base when assembled. To further retain its position, liquid receptacle member 70 may include registration tabs, such as registration tab 76, which may be received by registration notches, such as notch 69 of bracket member 60.

As contemplated, liquid receptacle member 70 may be removed from base member 50 and bracket member 60 and filled with water up to the FILL LINE. Once assembled, water is retained within the assembled reservoir 40 where it is protected from the elements and allowed to flow into compartments 56 and 57, giving birds access thereto. Accordingly, as shown in FIGS. 1 and 2, when liquid reservoir 40 is assembled and filled with water and received in bay 90 to define a mounted state, visiting birds may sip the water dispensed by water receptacle 70 into compartment 56, for example. It is preferred that compartment 56 be recessed to minimize seed and fecal contamination. Further, bracket member 60 may be colored blue so that over time, birds signify the blue color with that of a water source. Water compartment 56 may be located proximate to perches 19 to define drinking stations. As such, hopper feeder 10 shown here, is provided with a plurality of feeding stations 24 and a plurality of drinking stations 23, one associated with each compartment, from which both solid and liquid nutrients may be provided to the birds. Particularly, as shown here, liquid reservoir 40 is centrally located within birdseed reservoir 16 and one feeding station 24 flanks either side of drinking station 23.

FIGS. 9 and 10 shown an alternative hopper 110 that also includes a liquid reservoir 140 according to a second embodiment of the present invention. Similar to hopper 10 described above, hopper 110 includes pole mount 112, hanger 114, birdseed reservoir 116, platform 118, roof 120 and lid 122. As shown, lid 122 attaches to roof 120 via conventional hinges 121 as known in the art. Hopper 110 includes both feeding stations 124 and drinking stations 123. Hopper 110 is constructed somewhat similarly to hopper 10 described above in that platform 118 includes seed diffusers, such as diffuser 130, which help to evenly distribute seed to the respective bays 136. The bays 136, which are similar to bays 36 described above, are in fluid communication with birdseed reservoir 116 thereby to provide access to the birdseed therein. Other similar features with that of hopper 10 will not be repeated here. Hopper 110 does, however, include side frames 113, which secure to birdseed reservoir 116 to both reinforce the birdseed reservoir and provide an overall different aesthetic appearance. Further, hopper 110 includes frames such as frame 144, which outlines bay 190 to reinforce the sidewall of birdseed reservoir 116 and help to prevent damage thereto as liquid reservoir 140 is repeatedly removed and replaced. Again, arched bay 190 includes corridor 192 formed in birdseed reservoir 116 and channel 194 formed in platform 118. Platform 118 provides a bottom wall on which the liquid reservoir 140 may be seated when disposed in the bay in the mounted state. Absent from hopper 110, as compared to hopper 10, are the alcoves formed in the birdseed reservoir. Here, seed bays, such as bay 136 are exposed rather than sheltered by birdseed reservoir 116.

Figure 12:
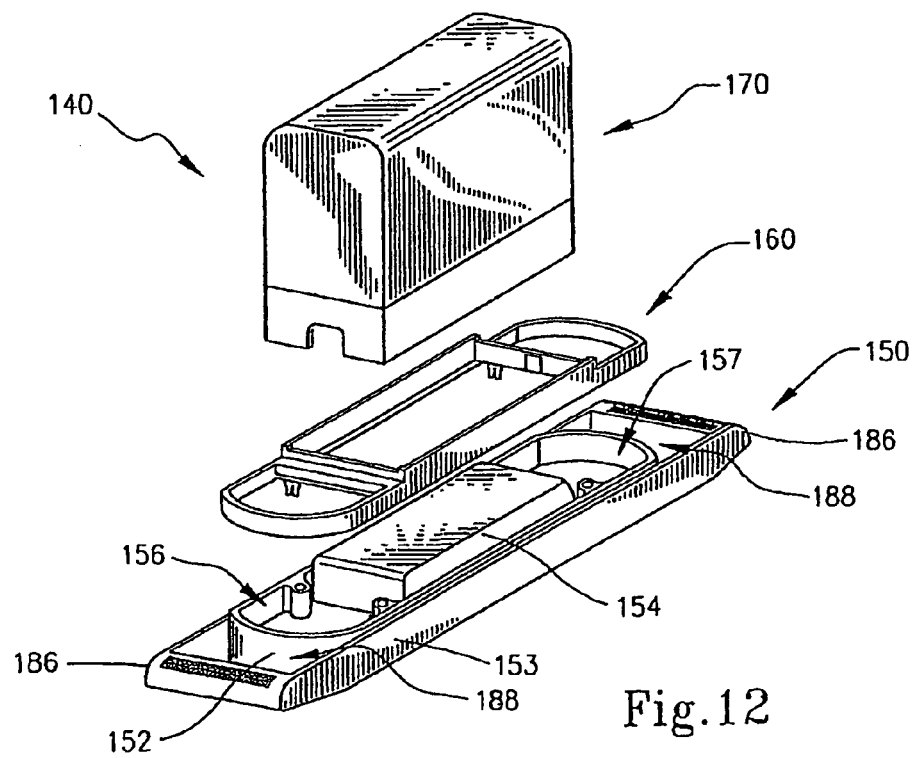
FIG. 12 is an exploded perspective view of the liquid reservoir incorporated by the birdfeeder shown in FIGS. 9 and 10.

With reference now to FIG. 12, liquid reservoir 140 has a somewhat similar construction to that of liquid reservoir 40 discussed above with respect to FIGS. 7 and 8. Here, liquid reservoir 140 generally includes base member 150, bracket member 160, and liquid receptacle member 170, which may be assembled as described above. Here, however, base member 150 includes an interior sidewall 152, an exterior sidewall 153, and platform 154. Interior sidewall 152 is of reduced height as compared to platform 154, which separates the base member into two liquid ports, shown here in the form of water compartments 156 and 157, which are in fluid communication with liquid receptacle member 170. Unlike liquid reservoir 40 described above, liquid reservoir 140 includes exterior sidewall 153, which extends beyond interior sidewall 152 to form perch openings 188 and perches 186. This construction of base 150 permits liquid reservoir 140 to conform to the construction of hopper 110 such that perches 186 are aligned with perches 119 as shown in FIG. 9.

Liquid reservoir 140 may be assembled as described above and disassembled to fill liquid receptacle member 170 in a manner similar to that described above. Further, bracket 160 may be colored blue, to again reinforce the identity of the blue color with the liquid reservoir of the present invention.

FIGS. 13-15 show alternative hopper feeders and liquid reservoirs contemplated by the present invention. In FIGS. 13 and 14, hopper feeder 210 is shown with feeding stations 224 and liquid reservoir 240 according to a third embodiment of the present invention. Hopper 210 is similar to hopper feeder 10 shown and described above with reference to FIGS. 1 and 2 and like that feeder, includes feeding stations 224 with 238. Platform 218, however, varies somewhat in that it includes lip 277. In this way, liquid reservoir 240 does not slide in and out of bay 290, but instead must be maneuvered up and over lip 277. Lip 277 helps retain liquid reservoir 240 within its bay 290, and is particularly useful in instances of high wind, or to keep liquid reservoir from harm by other seed eating animals that may happen along, such as squirrels and chipmunks.

Figure 11:
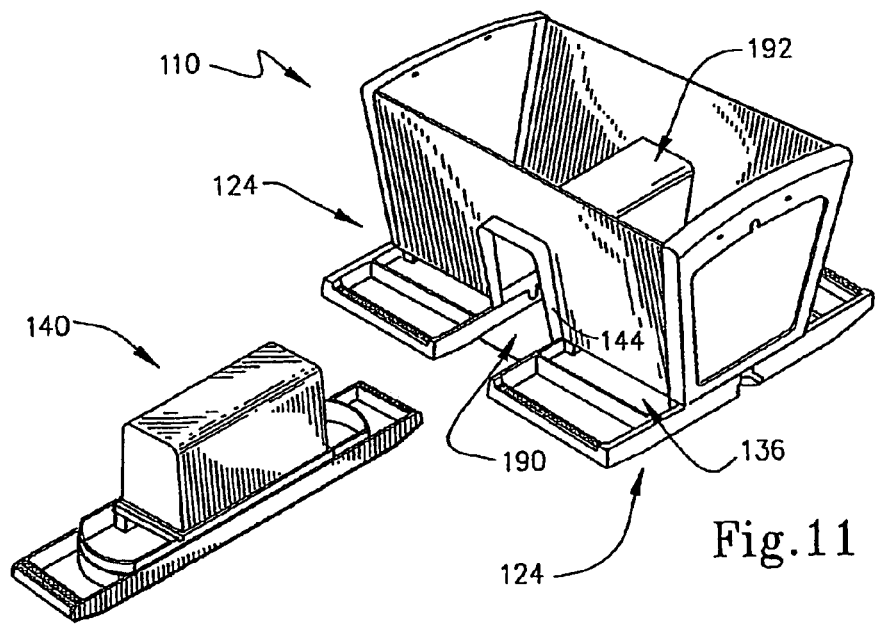
FIG. 11 is an exploded perspective view of the birdfeeder shown in FIGS. 9 and 10, without the roof, showing the liquid reservoir removed from its bay.

FIGS. 15 and 15(a) show a hopper feeder 310 coupled with a liquid reservoir 340 according to a fourth embodiment of the present invention. Here, hopper feeder 310 is of similar construction to the hopper feeder shown in FIGS. 9-11 above.

Here, however, hopper feeder 310 receives liquid reservoir 340 in a bay formed in its bottom wall 318 rather than through the sidewall of its birdseed reservoir. Door 392, which is hinged to bottom wall 318 with hinges 333, provides a seat for liquid reservoir 340 when it is received in the bay formed in the birdseed reservoir 316 in the mounted state. Door 392 includes knob 334 to facilitate opening and closing thereof for removal of liquid reservoir 340. In addition, a cover, such as a hinged door, may be latched over the bay to maintain liquid reservoir 340 therein. In this way, hopper feeder 310 may be suspended from a post, or other suitable supper by means of its hanger 314 to allow for easy access to liquid reservoir 340.

FIGS. 16 and 17 show a fifth embodiment of the feeder and liquid reservoir according to the present invention. As shown, bird feeder 410 is shown in the form of a tube feeder wherein birdseed reservoir 416 is in the form of a cylinder and food stations 424 are distributed along the length thereof. Liquid reservoir 440 is received within a lower portion 408 of feeder 410 and, as should be appreciated, lower portion 408 further includes a divider panel (not shown) to retain the seed within the feeder. Here, liquid reservoir 440 includes base 451 and water receptacle 470. Base 451 and water receptacle 470 may be releasably secured to one another, for example, by means of cooperating threads whereby the water receptacle 470 is screwed into base 451 or vice versa. Other suitable means are also contemplated. Liquid reservoir 440 may then be inserted into lower portion 408 of feeder 410 and secured thereto, again, by means of cooperating threads or other suitable means. As may be appreciated, once liquid reservoir 440 is inserted into feeder 410, birds may alight on perch 186 and access the water that has flowed into water compartments, such as water compartments 456 and 457.

FIGS. 18 and 19 show a sixth embodiment of the feeder and liquid reservoir according to the present invention. Here again, bird feeder 510 is shown in the form of a tube feeder. Here, however, feeding stations 524 are located proximate to the lower portion 508 of feeder 510 rather than along the length of the feeder. In addition, as opposed to FIGS. 16 and 17, liquid reservoir 540 shown in FIGS. 18 and 19, is adapted to be secured to top portion 506 of feeder 510 rather than inserted into the feeder altogether. In this way, feeder 510 further includes removable cap 505 to allow access into the interior of feeder 510 so that it may be filled with seed. Liquid reservoir 540 and top portion 506 of feeder 510 may include cooperating threads 504 so that liquid reservoir 540 may be screwed thereto. Further, as shown, since liquid reservoir 540 forms the top of feeder 510, it is equipped with a hanger 514 so that, the feeder can be suspended from a suitable support pole.

Figure 20:
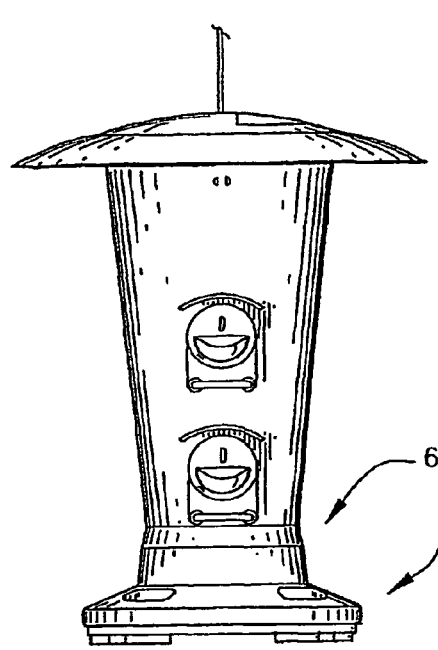
FIG. 20 is a front view in elevation of a birdfeeder and a liquid reservoir incorporated thereby both according to a seventh embodiment of the present invention.
Figure 21:
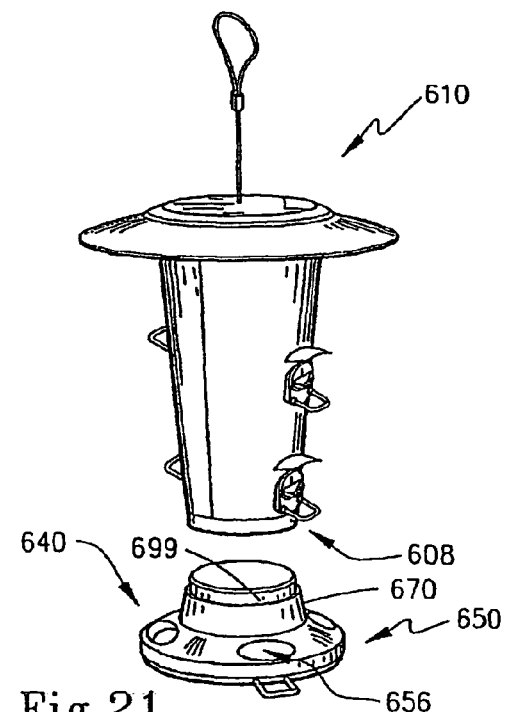
FIG. 21 is an exploded perspective view of the birdfeeder shown in FIG. 20 with the liquid reservoir removed from its bay.

FIGS. 20 and 21 show a seventh embodiment of the feeder and liquid reservoir according to the present invention. Here liquid reservoir 640 is adapted for insertion into the lower portion 608 of feeder 610 by cooperating threads 699. Water receptacle 670 is releasably secured to base 650 and birds may access the water once assembled via compartments such as compartment 656.

Figure 22:
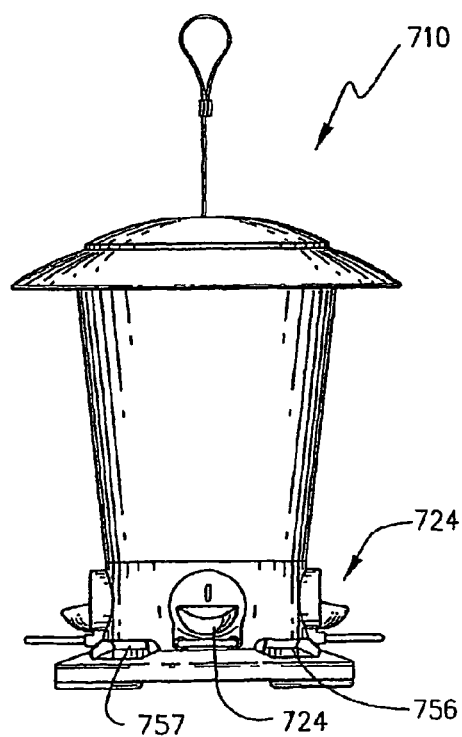
FIG. 22 is a front view in elevation of a birdfeeder and liquid reservoir incorporated thereby both according to an eighth embodiment of the present invention.
Figure 23:
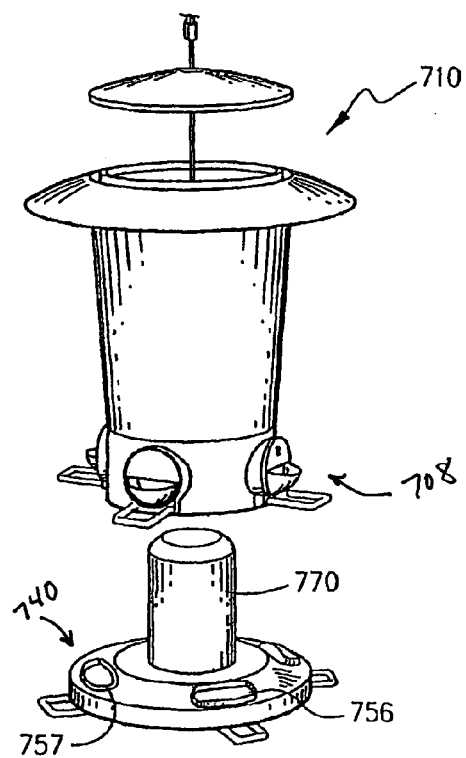
FIG. 23 is an exploded perspective view of the birdfeeder shown in FIG. 22 with the liquid reservoir removed from its bay.

FIGS. 22 and 23 show an eighth embodiment of the feeder and liquid reservoir according to the present invention. Similar to the feeder and reservoir discussed above with reference to FIGS. 20 and 21, liquid reservoir 740 is adapted for insertion into the lower portion 708 of feeder 710, which may be by means of cooperating threads or other suitable device known in the art. Here, water receptacle 770 is more cylindrical in configuration than that shown in FIG. 21 and may be adapted to hold more, water. Further, as shown in FIG. 22, when assembled, water compartments, such as water compartments 756 and 757 alternate with food stations 724.

FIG. 24 shows a ninth embodiment of the feeder and liquid reservoir according to the present invention. As shown, liquid reservoir 840 is adapted for insertion into feeder 810 via bay 890. Bay 890 includes a sidewall 891 that partitions birdseed reservoir 816 to accommodate liquid reservoir 840. In this way, seed is dispensed at feeding stations such as feeding station 824 and water is dispensed via water compartments such as water compartment 856.

FIGS. 25 and 26 show a tenth embodiment of the feeder and reservoir according to the present invention. As shown, liquid reservoir 940 is received within bay 990, which is formed in the sidewall of birdseed reservoir 916 of feeder 910. Further, as shown, liquid reservoir 940 is seated on platform 918 when inserted into bay 990.

Figure 27:
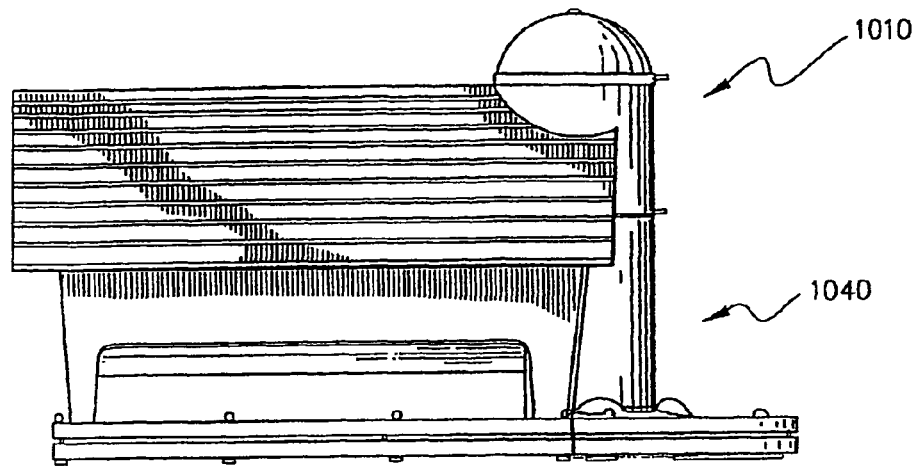
FIG. 27 is a right side view in elevation of a birdfeeder and a liquid reservoir incorporated thereby both according to an eleventh embodiment of the present invention.
Figure 28:
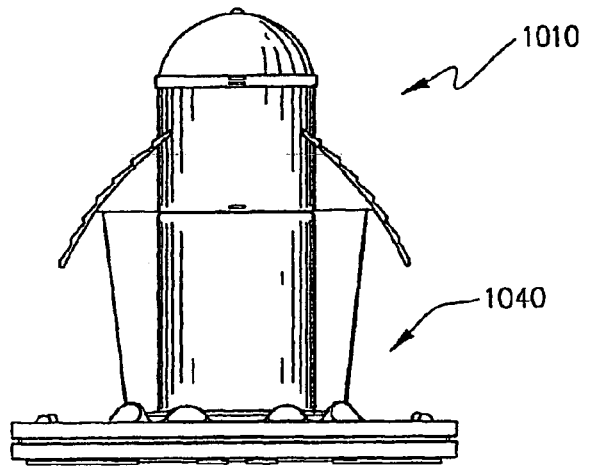
FIG. 28 is a front view in elevation of the birdfeeder and liquid reservoir shown in FIG. 27.
Figure 29:
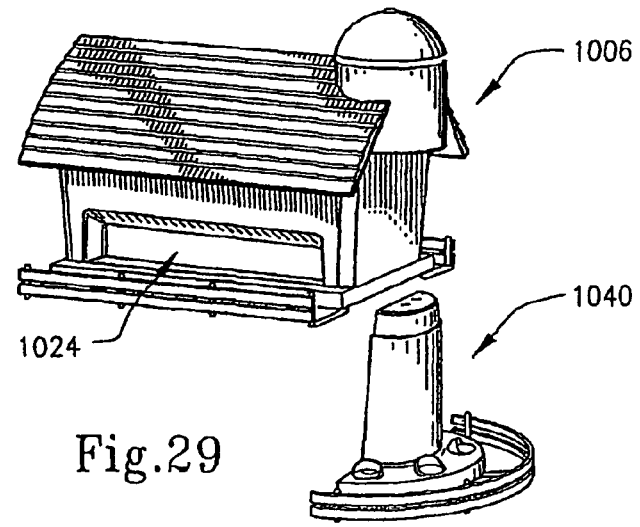
FIG. 29 is an exploded perspective view of the birdfeeder shown in FIGS. 27 and 28 with the liquid reservoir removed from its bay.

FIGS. 27-29 show an eleventh embodiment of the feeder and reservoir according to the present invention. As shown, feeder 1010 includes feeding stations, such as feeding station 1024 and liquid reservoir 1040. Liquid reservoir 1040 secures to a front section 1006 of feeder 1010 by means of cooperating registration tabs and notches, or by other suitable means known in the art.

FIGS. 30-34 show different liquid reservoirs that are contemplated as stand-alone liquid reservoirs. In other words, the liquid reservoirs shown in FIGS. 30-34 are not constructed for insertion into a feeder or to form an integral part of a seed dispensing bird feeder, but rather complement a bird feeder so as to be suspended or otherwise supported in close proximity to the bird feeder. Turning then to FIG. 30, a twelfth embodiment of the liquid reservoir 1140 according to the present invention is shown. Here, liquid reservoir 1140 includes suspension member 1113 that is adapted to be suspended from hanger member 1114 of tube feeder 1110. In this way, liquid reservoir 1140 may easily be accessed simply by removing it from hanger member 1114 so that it may be re-filled or cleaned as needed. Similarly, FIG. 31 shows an alternative stand-alone liquid reservoir 1240 wherein suspension member 1213 is disposed underneath the reservoir and feeder 1210 is suspended therefrom by hanger member 1214. Liquid reservoir 1240 may be further equipped with a second suspension member 1207 so as to suspend the entire assembly—liquid reservoir and feeder—from an appropriate support pole or other suitable support.

Figure 33:
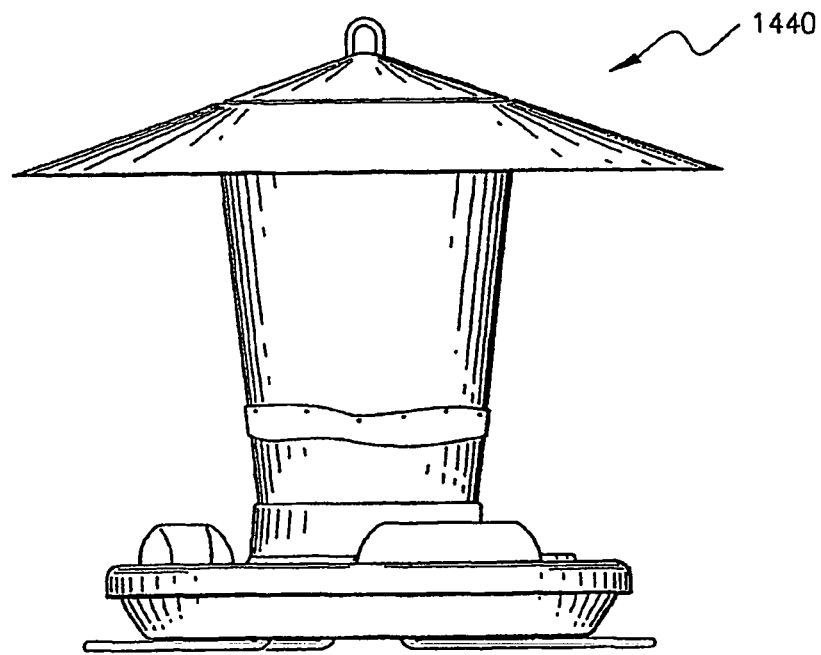
FIG. 33 is a front view in elevation of a liquid reservoir according to a fifteenth embodiment of the present invention.
Figure 34:
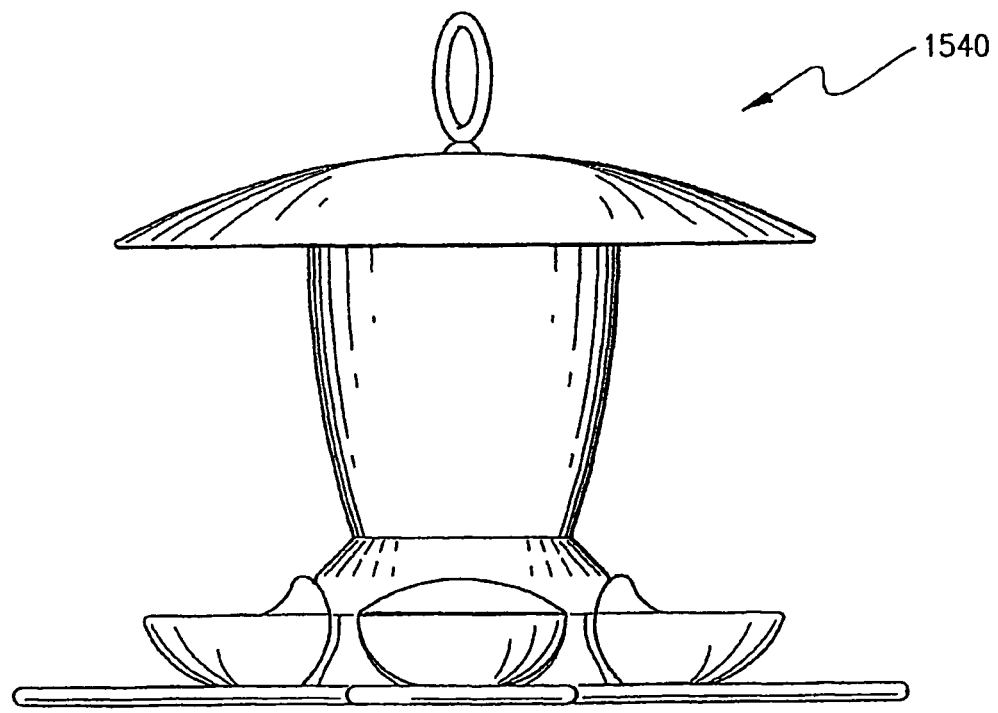
FIG. 34 is a front view in elevation of a liquid reservoir according to a sixteenth embodiment of the present invention.

FIG. 32 shows an alternative arrangement for a stand-alone liquid reservoir 1340 and feeder 1310 shown here as being suspended, independently, by arms 183 and 185 respectively. Finally, FIGS. 33 and 34 show further alternatives to the construction of a stand-alone liquid reservoir 1440 and 1540, which may be used, for example, as shown above with respect to FIGS. 30-32.

Various liquid reservoirs and bird feeders contemplated by the present invention have now been described. It should be appreciated that various bird feeder constructions can be configured to incorporation various ones of the liquid reservoirs described. For example, bird feeder 10, shown in FIGS. 1 and 2, may be configured so as to accommodate liquid reservoir 940 shown and described in FIGS. 25 and 26. In this way, perhaps, birdseed reservoir 16 would include an appropriately sized bay to receive the configuration of that liquid reservoir 940.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. An apparatus adapted to dispense nutrients to birds, comprising:
   (A) a housing assembly including
       (1) a first reservoir adapted to receive and dispense a solid nutrient; and
       (2) a second reservoir having a liquid nutrient port and adapted to receive and dispense a liquid nutrient through said liquid nutrient port, said second reservoir being positioned under said first reservoir and including a base member and a receptacle member supported by said base member and adapted to receive and contain a selected quantity of said liquid nutrient therein, said base member being in fluid communication with said receptacle member and including said liquid nutrient port;
   said first reservoir being tubular and including a plurality of feeding stations for dispensing birdseed, said feeding stations being distributed along a length of said first reservoir, and said liquid nutrient port being positioned lower than a lowermost of said feeding stations; and
   said first reservoir having a lower end with a hollow base part, said second reservoir being removably received within said hollow base part, and said first reservoir including a divider panel above said hollow base part to retain solid nutrients in said first reservoir.

2. The apparatus according to claim 1, wherein said second reservoir is threadably received in said hollow base part of said first reservoir when in the mounted state.

3. An apparatus adapted to dispense nutrients to birds, comprising:
   (A) a generally tubular housing assembly including
       (1) an upper component having a first reservoir adapted to receive and dispense a solid nutrient, said upper component having a bottom wall spaced upwardly from a lower edge of said upper component to define a hollow base part in the lower end of said upper component; and
       (2) a lower component having a second reservoir adapted to receive and dispense a liquid nutrient, said lower component with said second reservoir being sized and adapted to be removably connected to a lower end of said upper component to define a mounted state, said lower component being at least partly received within said hollow base part and removably connected to said upper component in the mounted state;
   (B) a first outlet port formed in a surrounding side wall of said upper component through which solid nutrients are accessible to birds, said first outlet port being in fluid communication with said first reservoir; and
   (C) a second outlet port in fluid communication with said second reservoir and positioned below the lower end of said upper component.

4. The apparatus according to claim 3 including a plurality of spaced apart first outlet ports.

5. The apparatus according to claim 3 including a plurality of spaced apart second outlet ports.

6. The apparatus according to claim 3 wherein said bottom wall of said upper component retains solid nutrients in said first reservoir.

7. The apparatus according to claim 3, wherein said second outlet port is formed in a base that is removably connected to said second reservoir.

8. The apparatus according to claim 7, wherein said second reservoir is received within said hollow base part with said base remaining outside of and below said upper component when said lower component is in the mounted state.

9. The apparatus according to claim 3 wherein said second reservoir is threadably received in said hollow base part of said upper component when in the mounted state.

10. The apparatus according to claim 3, wherein said second outlet port includes a base having at least one liquid nutrient compartment in liquid communication with said second reservoir.

11. A bird feeding apparatus adapted to dispense nutrients to birds, comprising:
    a tubular reservoir having a plurality of birdseed feeding stations for dispensing birdseed, said birdseed feeding stations being vertically spaced from one another along a length of said tubular reservoir, said tubular reservoir having a bottom wall spaced upwardly from a lower edge of said tubular reservoir to define a hollow base part in the lower end of said tubular reservoir; and
    a second reservoir adapted to receive and dispense a liquid nutrient through a liquid nutrient port in fluid communication with said second reservoir, said second reservoir being removably coupled to a lower end of said tubular reservoir and in generally vertical alignment therewith in the mounted state, said liquid nutrient port being positioned lower than said birdseed feeding stations in said tubular reservoir.

12. The bird feeding apparatus as set forth in claim 11, wherein at least part of said second reservoir is received within a lower part of said tubular reservoir.

13. The bird feeding apparatus as set forth in claim 11, wherein at least part of said second reservoir is received within said hollow base part in the lower end of said tubular reservoir.

14. The apparatus according to claim 11, wherein said bottom wall of said tubular reservoir retains solid nutrients in said tubular reservoir.

* * * * *